(12) United States Patent
Uriel et al.

(10) Patent No.: US 10,728,274 B2
(45) Date of Patent: Jul. 28, 2020

(54) METHOD AND SYSTEM FOR INJECTING JAVASCRIPT INTO A WEB PAGE

(71) Applicant: CHECKPOINT SOFTWARE TECHNOLOGIES LTD., Tel Aviv (IL)

(72) Inventors: Ilan Uriel, Reut (IL); Aviad Mor, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 558 days.

(21) Appl. No.: 15/272,452

(22) Filed: Sep. 22, 2016

(65) Prior Publication Data

US 2018/0084003 A1 Mar. 22, 2018

(51) Int. Cl.
*H04L 29/06* (2006.01)

(52) U.S. Cl.
CPC ...... *H04L 63/1441* (2013.01); *H04L 63/1483* (2013.01)

(58) Field of Classification Search
CPC .................. H04L 63/1441; H04L 63/1483
USPC .............................................. 726/23
See application file for complete search history.

(56) References Cited

U.S. PATENT DOCUMENTS

| | | | | |
|---|---|---|---|---|
| 8,464,318 B1 * | 6/2013 | Hallak | ............... | H04L 63/1416 726/4 |
| 8,516,590 B1 * | 8/2013 | Ranadive | ............ | H04L 63/1433 713/187 |
| 8,752,183 B1 * | 6/2014 | Heiderich | ............. | G06F 21/577 726/22 |
| 8,819,819 B1 * | 8/2014 | Johnston | ................. | G06F 21/53 709/206 |
| 9,626,359 B1 * | 4/2017 | Sun | ........................ | G06F 21/629 |
| 9,712,560 B2 * | 7/2017 | Sivan | .................... | G06F 16/986 |
| 2006/0253581 A1 * | 11/2006 | Dixon | .................... | G06Q 30/02 709/225 |
| 2007/0107057 A1 * | 5/2007 | Chander | ............... | G06F 21/562 726/22 |
| 2007/0113282 A1 * | 5/2007 | Ross | ..................... | G06F 21/566 726/22 |
| 2009/0222925 A1 * | 9/2009 | Hilaiel | .................... | G06F 21/53 726/25 |
| 2010/0125913 A1 * | 5/2010 | Davenport | .............. | G06F 21/54 726/25 |

(Continued)

*Primary Examiner* — Shin-Hon (Eric) Chen
*Assistant Examiner* — Dereena T Cattungal
(74) *Attorney, Agent, or Firm* — Mark M. Friedman

(57) ABSTRACT

Computerized methods and systems inspect data packets received from a web server for the presence of a value from a list of prohibited values. If a prohibited value is absent, a gateway injects at least one JavaScript code segment for execution by a web browser. The at least one JavaScript code segment includes a plurality of JavaScript functions which include at least one security analysis JavaScript function and a plurality of modified JavaScript functions. Each of the modified JavaScript functions is created from a respective native JavaScript function to include at least one code segment that when executed inspects for at least one of: a dynamic modification of at least one JavaScript function from a prohibited list of JavaScript functions, a dynamic creation of at least one JavaScript function from the prohibited list of JavaScript functions, or a dynamic reference to a value from the list of prohibited values.

22 Claims, 5 Drawing Sheets

(56) References Cited

U.S. PATENT DOCUMENTS

| | | | | |
|---|---|---|---|---|
| 2015/0339479 A1* | 11/2015 | Wang | ............ | H04L 63/1475 726/22 |
| 2015/0341385 A1* | 11/2015 | Sivan | ............ | H04L 63/1466 726/23 |
| 2015/0363598 A1* | 12/2015 | Xu | ............ | G06F 21/563 726/23 |
| 2016/0182537 A1* | 6/2016 | Tatourian | ............ | H04L 63/1416 726/23 |
| 2018/0063190 A1* | 3/2018 | Wright | ............ | H04L 63/168 |

* cited by examiner

METHOD AND SYSTEM FOR INJECTING JAVASCRIPT INTO A WEB PAGE

TECHNICAL FIELD

The present invention relates to methods and systems for injecting code into web page files.

BACKGROUND OF THE INVENTION

Determining whether a web page displayed on an endpoint client includes malicious content may be accomplished by scanning elements of the web page, for example, document object model (DOM) elements of an HTML page or JavaScript file attached to the web page. For example, some malicious web pages employ phishing techniques to illicitly obtain sensitive information such as, usernames, passwords, and credit card details, from users.

Since the web page elements change dynamically over the lifecycle of the web page, such scanning techniques are typically employed via web browser add-ons, previously installed on the endpoint client. However, such add-ons are web browser and operating system specific, and require installation and periodic software upgrades. Alternatively, a gateway coupling the endpoint client to a web server may inject JavaScript code into the web page received from the web server. However, the programming features of JavaScript allow hackers and originators of malicious content on web pages to override or disable such injected JavaScript code.

SUMMARY OF THE INVENTION

The present invention is directed to computerized methods and systems, which inspect data packets received from a web server, and inject JavaScript functions and methods, via files and/or scripts in an original web page, for execution on a web browser installed on, for example, an endpoint client.

Embodiments of the present invention are directed to a method for injecting JavaScript. The method comprises: inspecting at least one packet, received from a web server, for the presence of at least one value from a list of prohibited values; and should the at least one value be absent from the at least one packet, responding to the inspecting by injecting at least one JavaScript code segment for execution by a web browser, the at least one JavaScript code segment including a plurality of JavaScript functions, the plurality of JavaScript functions including at least one security analysis JavaScript function and a plurality of modified JavaScript functions, each of the modified JavaScript functions created from a respective native JavaScript function to include at least one code segment that when executed inspects for at least one of: a dynamic modification of at least one JavaScript function from a prohibited list of JavaScript functions, a dynamic creation of at least one JavaScript function from the prohibited list of JavaScript functions, or a dynamic reference to at least one value from the list of prohibited values.

Optionally, the method further comprises: executing at least one of the injected modified JavaScript functions based on identification of at least one event.

Optionally, the method further comprises: responding to the inspection as a result of the executing by taking at least one protective action.

Optionally, the method further comprises: responding to the inspection as a result of the executing by not executing the respective native JavaScript function.

Optionally, the at least one event includes at least one of a predetermined time interval or a trigger caused by the execution of code received from the web server.

Optionally, the at least one security analysis JavaScript function includes at least one code segment which identifies malicious content in an HTML page, a JavaScript file, or a JavaScript code segment.

Optionally, the executing is performed by a web browser is installed on an endpoint.

Optionally, the inspecting of the at least one packet and the injecting are performed by a gateway that couples the web server to a web browser, the web server providing content of a web page to the web browser.

Optionally, the method further comprises: should the at least one value be present in the at least one packet, responding to the inspecting by performing at least one of discarding the at least one packet, or terminating a connection with the web server.

Optionally, the list of prohibited values is a predefined list, the predefined list including every tag, variable, function, method and object associated with the at least one security analysis JavaScript function.

Optionally, at least one of the respective native JavaScript functions includes a JavaScript method.

Optionally, the list of prohibited values includes at least one of a namespace, a tag, a variable, a function, a method or an object associated with at least one JavaScript function selected from the group consisting of: the modified JavaScript functions, or the native JavaScript functions from which the modified JavaScript functions are created.

Optionally, the at least one packet forms at least part of an HTML page, a JavaScript file, or a JavaScript code segment.

Optionally, the injecting includes: locating the JavaScript code segment in the HTML page, the JavaScript file, or the JavaScript code segment, such that the modified JavaScript functions are the first code segments executed in the HTML page or JavaScript file, and such that the security analysis JavaScript function is the last or first code segment executed in the HTML page, the JavaScript file, or the JavaScript code segment.

Optionally, the list of prohibited values includes the prohibited list of JavaScript functions.

Embodiments of the present invention are directed to a computer system for injecting JavaScript. The computer system comprises: a gateway coupling a web server to a web browser. The gateway comprises: a storage medium for storing computer components; and a computerized processor for executing the computer components. The computer components comprise: a computer module configured for: inspecting at least one packet, received from the web server, for the presence of at least one value from a list of prohibited values; and should the at least one value be absent from the at least one packet, responding to the inspecting by injecting at least one JavaScript code segment for execution by a web browser, the at least one JavaScript code segment including a plurality of JavaScript functions, the plurality of JavaScript functions including at least one security analysis JavaScript function and a plurality of modified JavaScript functions, each of the modified JavaScript functions created from a respective native JavaScript function to include at least one code segment that when executed inspects for at least one of: a dynamic modification of a JavaScript function from a prohibited list of JavaScript functions, a dynamic creation of a JavaScript function from the prohibited list of JavaScript functions, or a dynamic reference to at least one value from the list of prohibited values.

Optionally, the list of prohibited values includes at least one of a namespace, a tag, a variable, a function, a method or an object associated with at least one JavaScript function selected from the group consisting of: the modified JavaScript functions, or the native JavaScript functions from which the modified JavaScript functions were created.

Optionally, the computer system further comprises: an endpoint coupled to the gateway, the endpoint having a web browser installed thereon, the web browser configured to execute code in the at least one packet associated with an HTML page, a JavaScript file, or a JavaScript code segment received from the web server via the gateway.

Optionally, the computer module is further configured for providing the at least one injected JavaScript code segment to the web browser, and wherein the web browser is further configured to execute at least one of the modified JavaScript functions.

Optionally, the web browser is further configured to execute the at least one security JavaScript function based on at least one of a predetermined time interval or a trigger caused by the execution of code received from the web server.

Optionally, should the at least one value be present in the at least one packet the computer module is further configured to respond to the inspecting by discarding the packet or terminating a connection with the web server.

Embodiments of the present invention are directed to a computer usable non-transitory storage medium having a computer program embodied thereon for causing a suitable programmed system to inject JavaScript, by performing the following steps when such program is executed on the system. The steps comprise: inspecting at least one packet, received from a web server, for the presence of at least one value from a list of prohibited values; and should the at least one value be absent from the at least one packet, responding to the inspecting by injecting at least one JavaScript code segment for execution by a web browser, the at least one JavaScript code segment including a plurality of JavaScript functions, the plurality of JavaScript functions including at least one security analysis JavaScript function and a plurality of modified JavaScript functions, each of the modified JavaScript functions created from a respective native JavaScript function to include at least one code segment that when executed inspects for at least one of: a dynamic modification of at least one JavaScript function from a prohibited list of JavaScript functions, a dynamic creation of at least one JavaScript function from the prohibited list of JavaScript functions, or a dynamic reference to at least one value from the list of prohibited values.

This document references terms that are used consistently or interchangeably herein. These terms, including variations thereof, are as follows:

A "computer" includes machines, computers and computing or computer systems (for example, physically separate locations or devices), servers, gateways, computer and computerized devices, processors, processing systems, computing cores (for example, shared devices), and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "gateway" is typically a remote computer or remote computer system, or computer program therein, in accordance with the "computer" defined above, that is accessible over a communications medium, such as a communications network or other computer network, including the Internet. A "gateway" provides services to, or performs functions for, other computer programs (and their users), in the same or other computers. A gateway may also include a virtual machine and a container, a software based emulation of a computer.

A "Uniform Resource Locator (URL)" is the unique address for a file, a web site or a web page, that is accessible on the Internet or other network, including a public or wide area network.

HTML (Hypertext Markup Language) is the set of markup symbols or codes inserted in a file intended for display on a World Wide Web browser page via a web browser.

An HTML object includes variations and extensions of HTML elements made by other web technologies, such as, for example, AngularJS.

The term "JavaScript function" refers to a JavaScript code segment which parameters or data may or may not be passed, and from which values or parameters may optionally be returned. The "JavaScript function" of an object or a class instance is referred to as a "JavaScript method". Throughout this document, the term "JavaScript function/method" indicates that the functionality of the function in question applies to both a "JavaScript function" and a "JavaScript method". When describing functionality that applies specifically to one of a "JavaScript function" or a "JavaScript method", but not the other, the explicit function definition for which the functionality applies will be used.

The term "native" when used in the context of JavaScript functions or methods refers to JavaScript functions and methods which are built-in to the JavaScript programming environment, or may be imported into the programming environment through libraries. A non-exhaustive list of examples of native JavaScript functions includes, but is not limited to:
 eval( );
 String( );
 parseInt( );
 append( );
 remove( );
 getElementsByTagsName( ).

The terms "instrumented function", "instrumented method", "instrumented code" and "code instrumentation" refer to the process of altering, modifying, augmenting, or otherwise changing a native JavaScript function or method to include additional code segments which perform operations in addition to the functionality performed by the native code function or method, which may include disabling the functionality performed by the native code function or method. The additional operations rendered by the additional code segments are performed prior to the functionality of the native JavaScript function or method and according to the results of the additional operations, may be used to decide whether or not to perform the functionality of the native JavaScript function.

A group of packets (e.g., data packets) includes at minimum one packet, which includes enough information, to conclude if the group of packets is part of a session with a Web Server and a web browser. The packet payload includes at least one JavaScript function or HTML object that can be inspected by a gateway.

A static scan is a scan performed on a gateway, prior to sending the group of packets to the web browser in order to identify if the group of packets include prohibited values.

A dynamic scan is a scan performed by a web browser, during execution of the web browser original code, in order to identify prohibited dynamic activity related to prohibited JavaScript functions/methods and/or prohibited values.

The term "linked" as used herein includes both wired or wireless links, either direct or indirect, and placing the computers, including, gateways, servers, components and the like, in electronic and/or data communications with each other.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
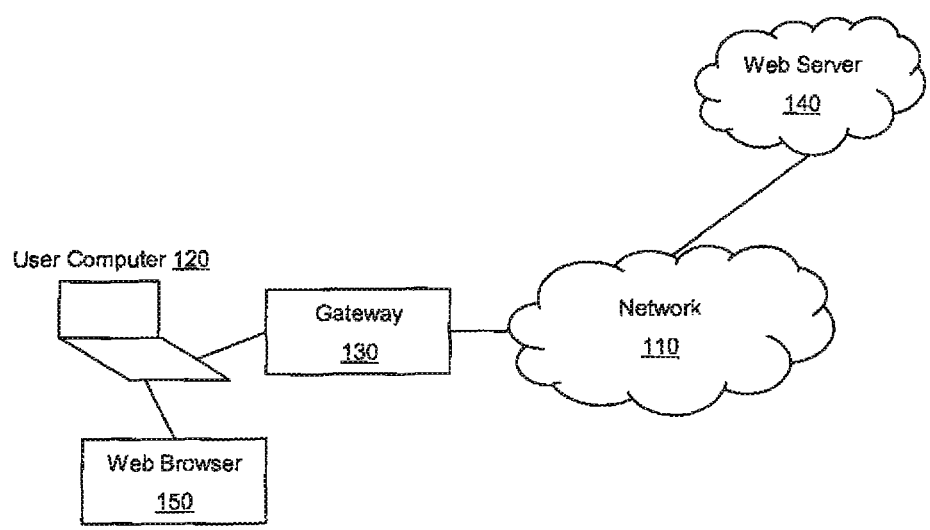
FIG. 1 is a diagram illustrating a system environment in which an embodiment of the invention is deployed.

The present invention is directed to computerized methods and systems, which inspect data packets received from a web server, and inject JavaScript functions and methods, via files and/or scripts in an original web page, for execution on a web browser installed on, for example, an endpoint client. The inspection and injection is performed by a gateway that couples the endpoint client to the web server. Code running on the gateway, via an agent, statically inspects groups of data packets, which are designated to a web browser, for prohibited values to identify unauthorized JavaScript function/method instrumentation attempts or references to prohibited characteristics or functions. In the absence of such prohibited values, the gateway code injects a security analysis JavaScript functions/methods and instrumented JavaScript functions/methods. The instrumented JavaScript functions/methods prevent the abuse and disabling of the security analysis JavaScript functions/methods. The gateway injected JavaScript functions/methods are sent to a web browser installed on the endpoint client, which executes the web server code and JavaScript code, which includes the injected JavaScript code.

As mentioned above, the inspection performed by the gateway is referred to a static scan, and the inspection performed by the web browser (as a result of the gateway injection) is referred to as a dynamic scan. Throughout this document, the term scan generally refers to the act of inspecting, analyzing, examining, or otherwise checking items, such as data packets and code segments, for the presence or occurrence of certain types of content or activity.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Refer now to FIG. 1, an illustrative example environment in which embodiments of the present disclosure may be performed over a network 110. The network 110 may be formed of one or more networks, including for example, the Internet, cellular networks, wide area, public, and local networks. The embodiments include a system 170 (FIG. 2), including, for example, an agent 160, installed on a gateway 130 connected to an endpoint client, for example, a user computer 120 (linked to the network 110). A web server 140, also linked to the network 110, provides to the user computer 120, via the gateway 130, data packets which form HTML pages, JavaScript files, or JavaScript code segments. The data packets may include various files and objects, including, but not limited to, Flash files, AngularJS files, JQuery files, Ajax files, Sencha files, XMLHttp objects, and XMLHttps objects.

The web server 140 represents numerous such servers which allow access, by the user computer 120, to web sites hosted by host servers (not shown). The data packets ultimately received on the user computer 120 are rendered for display on the user computer 120 via a web browser 150 installed on the user computer 120.

The agent 160 provides mechanisms for receiving and inspecting (i.e., scanning) incoming groups of data packets from the web server 140, as well as injecting JavaScript methods and functions into the received data packets based on the scanning outcome. The agent 160 includes software, software routines, code, code segments and the like, embodied, for example, in computer components, modules and the like, that are installed on machines, such as the gateway 130. For example, the agent 160 performs an action when a specified event occurs, as will be further detailed below. The agent 160 may be instructed to perform such actions through received instructions sent from the user computer 120 to the gateway 130. Alternatively, the agent 160 may be instructed to perform such actions by an administrator (not shown) which may be a computer separate from the user computer 120 linked to the user computer 120 via a private network, such as, for example, an Intranet, or may be linked to the user computer 120 via the network 110.

The system 170, and the agent 160 included therein, preferably operate in cooperation with anti-phishing and anti-malware software installed on the user computer 120 such as, for example, Norton anti-virus and McAfee anti-virus.

Figure 2:
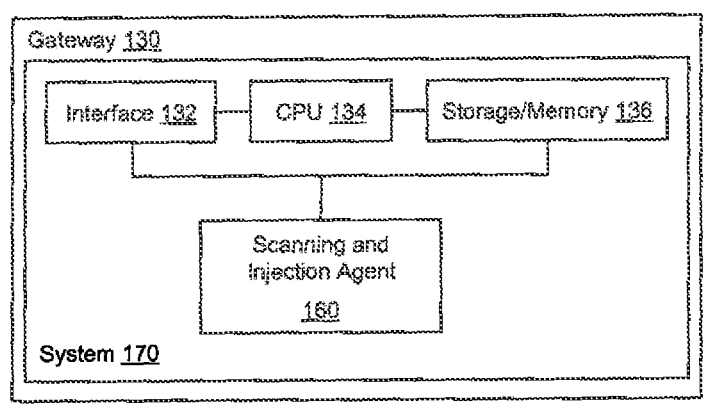
FIG. 2 is a diagram of the architecture of an exemplary gateway embodying the invention.

FIG. 2 shows the gateway 130 and the system 170 therein, as an architecture, with the agent 160 incorporated into the system 170 of the gateway 130. All components of the gateway 130 and/or the system 170 are connected or linked to each other (electronically and/or data), either directly or indirectly. The system 170 is referred to as "the system" in the description of FIG. 4 below.

The gateway 130 includes a central processing unit (CPU) 134, a storage/memory 136, and an interface 132 for exchanging packets with the network 110, for example, incoming data packets received from the web server 140. The processor of the CPU 134 and the storage/memory 136, although shown as a single component for representative purposes, may be multiple components. Although not shown in the drawings, the gateway 130 may include additional components and/or modules which are typically found in gateways as known in the art, such as, for example, operating systems for managing resources and providing common services for programs run on the gateway 130.

Figure 4:
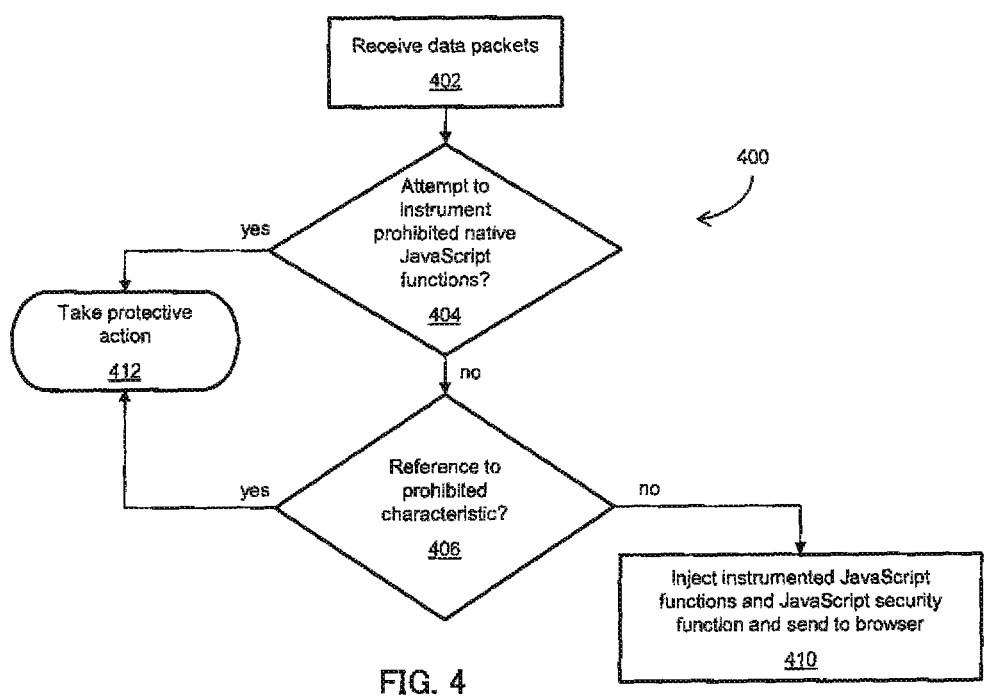
FIG. 4 is a flow diagram illustrating a process for data packet inspection performed by the gateway.

The CPU 134 is formed of one or more processors, including microprocessors, for performing respective functions of the gateway 130, including executing the functionalities and operations of the agent 160, as detailed herein, and including the processes shown and described in the flow diagram of FIG. 4. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 136 is any conventional storage media. The storage/memory 136 stores machine executable instructions for execution by the CPU 134, to perform the processes of the present embodiments. The storage/memory 136 also includes machine executable instructions associated with the operation of the components, including the agent 160, and all instructions for executing the processes of FIG. 4, detailed herein.

Figure 3:
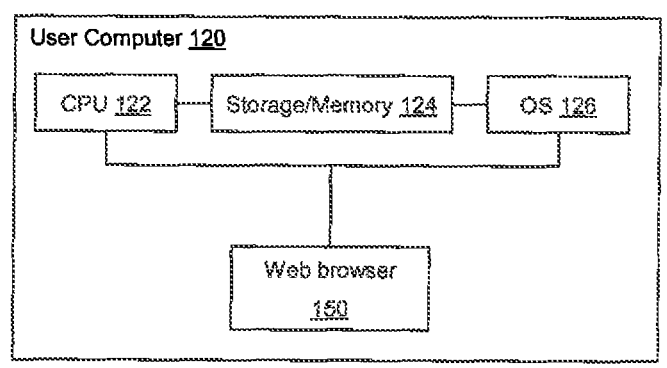
FIG. 3 is a diagram of the architecture of an exemplary endpoint client, including a web browser installed thereon, for which an embodiment of the invention is linked.

FIG. 3 shows an illustrative example of a user computer 120, which is linked to the system 170, as an architecture. The user computer 120 includes a CPU 122, a storage/memory 124, an operating system (OS) 126, and a web browser 150. The processors of the CPU 122 and the storage/memory 124, although shown as a single component for representative purposes, may be multiple components. The CPU 122 is formed of one or more processors, including microprocessors, for performing the user computer 120 functions, including executing the functionalities and operations of the web browser 150, as detailed herein, the OS 126, and including the processes shown and described in the flow diagram of FIG. 5. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the web browser 150, and all instructions for executing the processes of FIG. 5, detailed herein.

The OS 126 includes any of the conventional computer operating systems, such as those available from Microsoft of Redmond Wash., commercially available as Windows® OS, such as Windows® XP, Windows® 7, MAC OS and iOS from Apple of Cupertino, Calif., or Linux based operating systems such as those available from Google of Menlo Park Calif., commercially available as Android OS.

The web browser 150 is, for example, any web browser used on a computer system for accessing data on the world wide web, such as, for example, Microsoft® Internet Explorer® or Mozilla Firefox®. The web browser 150 executes web server code received from the web server 140 via the gateway 130, as well as code injected by the gateway 130.

It is noted herein that although the illustrative example and environment in which embodiments of the present disclosure may be performed have thus far pertained to a web browser installed on an endpoint client (e.g., user computer) coupled to a web server via a gateway, other examples and environments are possible. Without loss of generality, the web browser 150 may be any application that runs a JavaScript engine, which includes the exemplary commercial web browsers such as Microsoft® Internet Explorer® or Mozilla Firefox® mentioned above, but may further include graphical user interfaces (GUIs) and payload applications such as Adobe® Acrobat.

The agent 160 is, for example, software which runs as a background process on the operating system of the gateway 130. The agent 160 functions to prevent disabling or abuse of security analysis JavaScript functions/methods by statically scanning groups of data packets received from the web server 140, preferably in real-time, and injecting JavaScript functions/methods, as described in detail below with reference to FIG. 4, in cooperation with injected JavaScript functions/methods executed by the web browser 150, as described in detail below, with reference to FIG. 5. The JavaScript functions/methods are injected by the gateway 130, using techniques known in the art, based on the scanning outcome. The injection results in the arrival of data packets at the web browser 150 which include some or all of the content of the scanned data packets as well as the injected JavaScript code.

The JavaScript functions/methods injected by the gateway 130 fall into two categories. The first category includes security analysis JavaScript functions/methods which when executed by the web browser 150 perform analysis functions which send analysis information, for example in the form of DOM inspection vectors, to the gateway 130 or to another entity, such as, for example, a server linked to the gateway 130. For example, the security analysis JavaScript functions/methods may contribute to the performance of anti-malicious functionality, such as, for example, anti-phishing functionality. For example, when the inspection vectors are provided to a security server linked to the gateway 130, the security server may identify the presence of malicious content based on the inspection vectors rendered by the execution of the security analysis JavaScript functions/methods. For instance, such security analysis JavaScript functions/methods may inspect the domain name of a URL of a web site accessed by the user of the user computer 120 in order to determine if the web site is authentic. An originator of a phishing web site may attempt to obtain username and password information from the user by mimicking the user login page of commonly known web sites. For example, such a phishing attempt may mimic the web site www.apple.com with a fake user login page for the web site www.appl1e.com (i.e., adding an extra "1" to the URL).

The fake user login page would, for example, include the same "username" and "password" input fields as in the authentic web site. As such, a security analysis JavaScript function/method may inject code into the HTML page, JavaScript file or code segment that checks the authenticity of the URL. If the URL is determined to be inauthentic, the security analysis JavaScript function/method may, for example, use JavaScript functions/methods to disable some or all of the functionality of the inauthentic web site. As an example, a security analysis JavaScript function for authenticating the domain name of a URL may be implemented via the following pseudocode:

```
<checkPointSecurityFunction>
    var domain = function getCPDomainName( ) {
    if domain is not authentic domain name {
        disable page by disabling click buttons and text elements
    }
    }
</ checkPointSecurityFunction>
```

For example, the security analysis JavaScript function may use the "getCPDomainName" function to check the authenticity of a domain against a reputation server, which although not shown in the drawings, may be linked to the gateway 130. If the domain is not authentic, the text elements and click buttons are disabled, thereby effectively disabling the inauthentic web page.

The second category of JavaScript functions/methods injected by the gateway 130 includes instrumented JavaScript functions/methods. The instrumented functions/methods are created from a specific subset of JavaScript functions/methods which are native to the JavaScript programming language environment. The subset of JavaScript functions/methods include those which can be used to enumerate over an HTML page DOM and extract information from the HTML page DOM, and which can dynamically create DOM elements. A non-exhaustive list of such functions/methods includes, but is not limited to: append( ), appendChild( ), remove( ), getElementsByTagsName( ), getEelementsByClassName( ), getElementByID( ), document.href, Element.prototype, New Script( ) and write( ).

The instrumented JavaScript functions/methods include additional code segments which perform checks for preventing dynamic creation of, modification of, or reference to JavaScript functions/methods that generate code segments that include referencing to the security analysis JavaScript functions/methods by various prohibited characteristics associated with the security analysis JavaScript functions/methods, as well as the dynamic creation of, modification of, or reference to JavaScript functions/methods that generate code segments that attempt to instrument prohibited native JavaScript functions. Such characteristics may include, but are not limited to, namespaces, variables, functions, methods, objects, and tags associated with the security analysis JavaScript functions/methods. If the checks performed by the additional code segments are passed, the instrumented JavaScript function/method executes the native JavaScript function/method. As an example, the JavaScript method getElementById( ) may be instrumented via the following pseudocode:

```
<checkPointInstrumentFunction>
    var original_getElementById = getElementsById;
    getElementById = function(id){
        if(id == checkPointSecurityFunction){
            return malicious_code;
        } else{
            original_getElementById(id);
        }
    }
</checkPointInstrumentFunction>
```

In the above example, the instrumented function includes code that assigns the getElementById method native to the JavaScript programming environment into the variable original_getElementById. The comparison performed by the "if" statement prevents referencing the injected security analysis JavaScript function getCPDomainName by an identifier, namely the script tag checkPointSecurityFunction. The "if" statement performs various comparisons, including, but not limited to, string comparisons, such as, for example, ASCII string comparisons, and binary-to-text code comparisons, such as, for example, base64 code comparisons. In this way, the instrumented JavaScript functions prevent direct ASCII string referencing of prohibited values (e.g., variables, functions, objects, and tags) as well as encoded/decoded referencing of such prohibited values. As a result, if the above mentioned "if" statement comparisons result in an identification of prohibited variables, methods, functions, objects, and tags, the native JavaScript function/method from which the instrumented JavaScript function/method was created is not executed.

If as the result of the above mentioned "if" statement comparisons, no references to prohibited variables, methods, functions, objects, or tags are present, the native JavaScript function/method from which the instrumented JavaScript function/method was created is executed. For example, with continued reference to the above checkPointInstrumentFunction example, if no such prohibited variables, functions, methods, objects, or tags are associated with the checkPointSecurityFunction are referenced, the instrumented JavaScript function executes the statement original_getElementById(id), which performs the original functionality of the native JavaScript function/method.

As mentioned above, the analysis functions performed by the injected JavaScript functions/methods provide metrics and other data to the gateway 130 or security server linked to the gateway 130. The prohibition of referencing the security analysis JavaScript functions/methods prevents disabling of the security analysis JavaScript functions/methods by an adversarial party.

It is noted herein, that the term "adversarial party" generally refers to any party which performs activity on existing original web content such that the original web content is modified prior to view by a user (e.g., the user computer 120), with the intent of obtaining information or data from users (e.g., the user computer 120) viewing or accessing such modified web content, or generates original web content with the intent of illicitly obtaining information or data from users (e.g., the user computer 120) viewing or accessing such original web content. An example of an adversarial party is a user (e.g., a third party hacker) operating a computer which modifies original web content, via injection or other means, provided by a web server separate from the adversarial party, in order to obtain user related information and data. A further example of an adversarial party is a provider of original web content which illicitly attempts to obtain user related information and data, commonly referred to as a phishing attempt via a phishing web site.

It is further noted herein that certain parties classified as "adversarial parties" may include diagnostic and data tracking parties which perform benign and/or non-offensive modification of original web content, such as, for example, as performed by Google Analytics.

Any or all of the security analysis JavaScript functions/methods and the instrumented JavaScript functions/methods may be generated by, for example, an administrator linked to the user computer 120, and stored in a memory of the gateway 130, such as, for example, the storage/memory 136 or other readable/writeable storage devices coupled to the gateway 130. In a preferred but non-limiting implementation, all of the instrumented and security analysis JavaScript functions/methods are predefined and are stored in such a memory of the gateway 130, prior to the exchange of any packets with the network 110. As such, the list of prohibited namespaces, variables, functions, methods, objects, and tags are preferably programmed and stored in the storage/memory 136 or other readable/writeable storage devices coupled to the gateway 130.

Note that JavaScript functions/methods may be added to or removed from the predefined instrumented JavaScript functions/methods. Updates to the list of prohibited namespaces, variables, functions, methods, objects, and tags accompany any such additions and removals. Additionally, the predefined instrumented JavaScript methods/functions may be further modified to change the code functionality of the instrumented functions/methods. All changes to the predefined instrumented JavaScript functions/methods may be implemented by code changes programmed into the machine executable instructions of the storage/memory 136.

The JavaScript functions/methods to be injected by the agent 160 are retrieved from the memory prior to injection by the gateway 130. Alternatively, the agent 160 may additionally function to generate any or all of the security analysis JavaScript functions/methods and the instrumented JavaScript functions/methods. As should be apparent, a subset of the security analysis and instrumented JavaScript functions/methods to be injected by the agent 160 may be retrieved from such a memory, while the remaining security analysis and instrumented JavaScript functions/methods to be injected by the gateway 130 may be generated by the agent 160.

As mentioned above, the gateway 130 and the web browser 150, executing code injected by the gateway 130, cooperate to prevent disabling and abusing of the security analysis JavaScript functions/methods. In an exemplary series of processes to provide security analysis JavaScript functions/methods and prevent disabling of the security analysis JavaScript functions/methods, the system 170 first statically scans groups of incoming data packets received from the web server 140, which are designated for the web browser 150, in order to aid in preventing the override or nullification of the instrumented JavaScript functions/methods by an adversarial party. During the scan, the system 170 inspects each group of data packets to determine if the data packets in the group include any value from a predefined list of prohibited values. The prohibited values include but are not limited to, namespaces, variables, functions, methods, objects, and tags (i.e., script tags) associated with specific JavaScript functions/methods, as well as certain prohibited characters (e.g., ASCII characters).

Identification of prohibited namespaces, variables, functions, methods, objects, and tags in a received data packet, by the system 170, indicates an attempt to reference gateway injected JavaScript functions/methods associated with the prohibited namespaces, variables, functions, methods, objects, and tags by an adversarial party. By referencing gateway injected JavaScript functions/methods, the adversarial party may be able to override or nullify those functions/methods. The gateway injected security analysis and instrumented JavaScript functions/methods all belong to a specific domain, and as such, can be identified by unique function/method names and/or script tags with unique names, which should not be referenced by any adversarial party. Script tags identify a block of script in the HTML page, the JavaScript file, or the JavaScript code segment, and also load files associated with the script. For example, a block of script that includes an injected security analysis JavaScript function/method which checks the authenticity of a URL may be identified by the script tag <checkPointInjectedCodeBlock> (identifying the beginning of the block), and </checkPointInjectedCodeBlock> (indicating the end of the block). Based on the unique names (i.e., function/method names and script tags), no adversarial party should ever reference gateway injected JavaScript functions/methods in the blocks of script.

A noted feature of the JavaScript programming language is the ability to declare a specific JavaScript function/method multiple times within a single code script. As a result, only the last declared specific function/method is accessible and executed, rendering all previously declared specific functions/methods ineffectual. While this noted feature has many benefits, one significant drawback is the ability of an adversarial party to instrument JavaScript functions/methods which can be used to enumerate over an HTML page DOM and extract information from the HTML page DOM, and which can dynamically create DOM elements. The adversarial party instrumented JavaScript functions/methods may then be injected by the adversarial party such that they are executed after the gateway injected instrumented JavaScript functions/methods. As a result, the gateway injected instrumented JavaScript functions/methods are rendered ineffectual.

In order to combat an adversarial party from instrumenting JavaScript functions/methods which counteract those instrumented and injected by the gateway 130, the system 170 also identifies prohibited characters (e.g., ASCII characters) in a received data packet which indicate an attempt to instrument a prohibited native JavaScript function/method, by an adversarial party, which can be used to alter or disable the security analysis JavaScript function. If the system 170 identifies any such prohibited values in a received data packet, the agent 160 may initiate (by signaling) the taking of protective actions. For example, protective actions may include prevention, by the gateway 130, of propagating the data packet received from the web server 140 to the user computer 120 by dropping (i.e., discarding) the data packet. Protective actions may also include remediation actions such as: 1) displaying a message, warning window, or the like, on the user computer 120; 2) alerting or notifying a system administrator about the security incident; and 3) quarantining the user computer 120 by blocking the user computer 120 from accessing the network 110, or otherwise disconnecting the user computer 120 from the network, or disabling the user computer 120.

In addition, the instrumented and security analysis JavaScript functions/methods are injected by the gateway 130 such that they are located in a strategic section of the HTML page, JavaScript file or code segment (formed by the groups of data packets). As a result of the strategic locations, the instrumented JavaScript functions/methods are the first code segments executed in the HTML page, JavaScript file or code segment, and the security analysis JavaScript function is the first or last code segment executed in the HTML page, JavaScript file or code segment. As such, every attempt by an adversarial party to instrument a JavaScript function/method is overridden by the file injected by the gateway 130. Furthermore, attempts to tamper with the security analysis JavaScript function, or create fraudulent security analysis JavaScript functions, are prevented.

If the system 170 does not identify any such prohibited values in a received group of data packets, the agent 130 injects the instrumented and security analysis JavaScript functions/methods. The injection may be performed by including the instrumented and security analysis JavaScript functions/methods in a file (which includes scripts) or file streams, and sending the file to the web browser 150 for execution, along with original code from the web server 140.

The web browser 150, in cooperation with the gateway 130, executes the JavaScript code in the files received from the gateway 130 to perform a dynamic scan which identifies the dynamic creation or modification of prohibited JavaScript functions/methods which generate code segments that include mentioning or referencing to prohibited characteristics (i.e., characteristics associated with the security analysis JavaScript function), or include attempts to instrument native JavaScript functions/methods which can be used to alter or disable the security analysis JavaScript function. The dynamic scan also identifies dynamic references to the security analysis JavaScript function or to values associated with the security analysis JavaScript function.

The original web server code calls each JavaScript function/method in the received data packet. Non-instrumented JavaScript functions/methods are called (i.e., executed) by the web server code. Instrumented JavaScript functions/methods are called (i.e., executed) by a JavaScript engine (i.e., a program or library that executes JavaScript code) running on the web browser 150. The execution of the instrumented JavaScript functions/methods checks for references to prohibited characteristics associated with the specific domain, specifically the security analysis JavaScript functions/methods injected by the gateway 130. Identification of any such references results in protective actions by the web browser 150, which are preferably transparent to the user of the user computer 120. For example, such protective actions block or prevent adversarial parties from tampering, disabling, or otherwise abusing the security analysis JavaScript functions/methods.

As mentioned above, the injected code received from the gateway 130 include both instrumented and security analysis JavaScript functions/methods. As a result, the original web server code additionally calls (i.e., executes) the injected security analysis JavaScript function/method, which as mentioned above may be received by the web browser 150 in a file or file stream. As mentioned above, the security analysis JavaScript functions/methods perform anti-malicious, for example, anti-phishing, functionality. If as a result of the execution of the security analysis JavaScript functions/methods a malicious threat is identified (e.g., a phishing attempt), the web browser 150 takes additional transparent protective actions, by, for example, disabling any or all of the functionality of the phishing web site. As will be described in more detail below, the security analysis JavaScript functions/methods are called (i.e., executed) by the web server code based on event triggers. The event triggers may be predefined time based periodic triggers which result in the periodic execution of security analysis JavaScript functions/methods, for example every few seconds, in order to fortify the defense against malicious threats. The security analysis JavaScript functions/methods may also be called by the web server code upon other types of event triggers, such as, for example, browsing to a known suspicious web site.

Attention is now directed to FIG. 4 which shows a flow diagram detailing computer-implemented process 400 in accordance with embodiments of the disclosed subject matter. This computer-implemented process includes an algorithm for statically scanning data packets received from the web server 140 and injecting JavaScript functions/methods based on the outcome of the scanning. Reference is also made to the elements shown in FIGS. 1-3. The process and sub-processes of FIG. 4 are computerized processes performed by the system 170 including, for example, the CPU 134 and associated components, such as the agent 160, at the gateway 130. The aforementioned processes and sub-processes are for example, performed automatically, but can be, for example, performed manually, and are performed, for example, in real-time.

The process 400 begins at block 402, where a group of data packets, which includes at least one data packet, is received by the gateway 130 (i.e., the system 170) from the web server 140. As noted above, the data packets received from the web server 140 form an HTML page, a JavaScript file, or a JavaScript code segment, the contents of which are executed by the web server code. The system 170 inspects the contents of the data packets for prohibited values via the execution of blocks 404 and 406.

In block 404, the system 170 inspects for characters or values which indicate an attempt to instrument a prohibited native JavaScript function/method, by an adversarial party, which can be used to alter or disable a security analysis JavaScript function. For example, with reference to the above getElementById instrumentation example, any function/method which is not followed by an open parenthesis, i.e., "(", indicates a prohibited function/method instrumentation attempt by an adversarial party. If the system 170 determines an adversarial party attempt to instrument any of the subset of native JavaScript functions/methods, as determined in block 404, the process 400 moves to block 412, where the agent 160 initiates (by signaling) the taking of protective action by the gateway 130. For example, protective actions may include prevention, by the gateway 130, of propagating the data packets received from the web server 140 to the user computer 120 by dropping (i.e., discarding) the data packets. Protective actions may also include remediation actions such as: 1) displaying a message, warning window, or the like, on the user computer 120; 2) alerting or notifying a system administrator about the security incident; and 3) quarantining the user computer 120 by blocking the user computer 120 from accessing the network 110, or otherwise disconnecting the user computer 120 from the network, or disabling the user computer 120.

In the event that the method instrumentation attempt is designed for non-offensive use, such as, for example, for compiling benign and non-intrusive data and statistics related to certain web sites, such as performed by Google Analytics, the adversarial party attempting the instrumentation may be added to a white list stored in a memory coupled to the gateway 130, for example, the storage/memory 136. As such, future instrumentation attempts by the white listed adversarial party will not trigger protective action taking by the gateway 130.

If the system 170 does not determine any adversarial party attempt to instrument any of the subset of JavaScript methods, the process 400 moves to block 406, where the system 170 identifies any attempts to reference prohibited characteristics related to the gateway injected JavaScript functions/ methods, specifically security analysis JavaScript functions/ methods, associated with the prohibited namespaces, variables, functions, methods, objects, and tags by an adversarial party. Specifically, the system 170 inspects (i.e., statically scans) the data packets for any usage of methods or functions belonging to the specific domain or namespace, identified by unique function/method names and/or script tags with unique tag names. The inspection by the system 170 also includes identifying any direct reference or use of methods instrumented by the gateway 130. As mentioned above, any adversarial party reference to methods or functions directly by unique name or by the unique script tag names is prohibited.

If the system 170 identifies attempts to reference gateway injected JavaScript functions/methods, as determined in block 406, the process 400 moves to block 412. If the system 170 does not identify any such attempts, the process 400 moves to block 410, where the instrumented JavaScript functions/methods and the security analysis JavaScript functions/methods are injected for execution by the web browser 150. As previously mentioned, the injection may be accomplished using techniques known in the art, and results in the arrival of data packets at the web browser 150 which include some or all of the content of the scanned data packets as well as the injected JavaScript code. As previously mentioned the injection may be accomplished by including the instrumented JavaScript functions/methods and the security analysis JavaScript functions/methods in a file that includes a script, which is then sent to the user computer 120 for execution by the web browser 150.

It is noted that the order of the execution of blocks 404 and 406 may be swapped such that block 406 is execute prior to block 404. It is also noted that in certain non-limiting implementations, the functionality of blocks 404 and 406 may be performed by a single block which simultaneously scans and inspects data packets received from the web server 140 for both instrumentation attempts and references to prohibited characteristics (e.g., namespaces, variables, functions, methods, objects, and tags).

Figure 5:
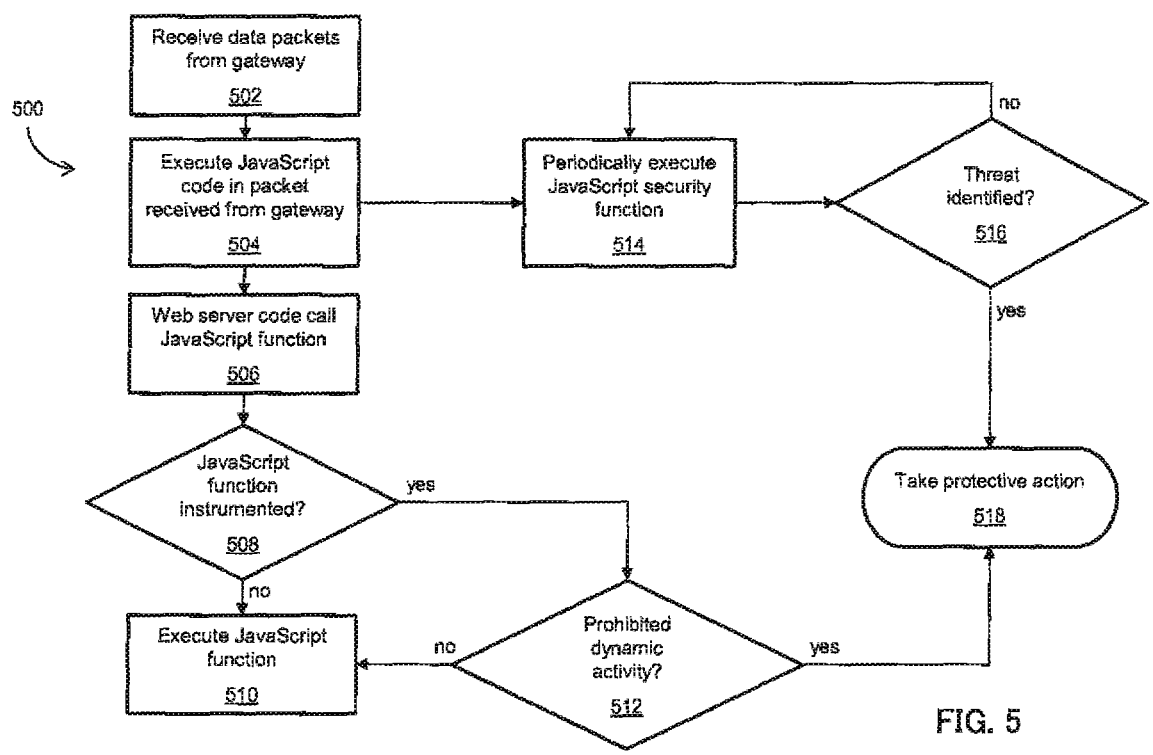
FIG. 5 is a flow diagram illustrating a process for executing code received from the gateway, performed by the web browser.

Attention is now directed to FIG. 5 which shows a flow diagram detailing a computer-implemented process 500 in accordance with embodiments of the disclosed subject matter. This computer-implemented process includes an algorithm for executing the web server 140 code, that includes JavaScript injected code from the gateway 130. Reference is also made to the elements shown in FIGS. 1-4. The process and sub-processes of FIG. 5 are computerized processes performed by the user computer 120 including, for example, the CPU 122 and associated components, such as the web browser 150. The aforementioned processes and sub-processes are for example, performed automatically, but can be, for example, performed manually, and are performed, for example, in real-time.

The process 500 begins at block 502, where data packets, including the injected security analysis and instrumented JavaScript functions/methods, are received by the web browser 150 from the gateway 130. The process 500 then moves to block 504, where the JavaScript code in the data packet(s) received from the gateway 130 is executed by the web browser 150.

From block 504, the process 500 moves to both block 514, which will be discussed in more detail below, and to block 506 where the web server code calls a JavaScript function/method in the received JavaScript code for execution. The process 500 then moves to block 508, where the web server code checks whether the JavaScript function/method is an instrumented function/method. If the JavaScript function/ method is not an instrumented function/method, the process 500 moves to block 510, where the JavaScript function/ method is executed by the web server code running on the web browser 150.

If the JavaScript function/method is an instrumented function/method, the process 500 moves to block 512, where the additional code segments in the instrumented JavaScript function/method inspect for prohibited dynamic activity related to prohibited values and/or JavaScript functions/ methods. The prohibited dynamic activity includes dynamic creation of prohibited JavaScript functions/methods, dynamic modification of prohibited JavaScript functions/ methods, or dynamic reference to prohibited values. The prohibited values, for which the executed code inspects, include any namespace, tag, variable, function, method or object associated with the instrumented JavaScript functions/methods or native JavaScript functions/methods which can be used to alter or disable the security analysis JavaScript functions/methods. As a result, an adversarial party is prevented from disabling or altering the security analysis JavaScript functions/methods. Such an adversarial party is furthermore prevented from creating fraudulent security analysis JavaScript functions/methods which perform none of the functionality of the security analysis JavaScript functions/methods injected by the gateway 130, but that when executed by the web browser 150, may indicate successful execution of the gateway 130 injected security analysis JavaScript function/method.

The additional code segments in the instrumented JavaScript function/method also inspect for the dynamic creation of, modification of, or reference to JavaScript functions/methods that include references to prohibited characteristics associated with the security analysis JavaScript functions/methods. The prohibited characteristics include any namespace, tag, variable, object, function, or method that may be used to reference any of the security analysis JavaScript functions/methods.

If the inspection does not yield the dynamic activity related to any such JavaScript functions/methods, the process 500 then moves to block 510, where the native JavaScript function/method from which the instrumented JavaScript function/method was created, is executed. If, however, the inspection yields the dynamic activity related to any such JavaScript functions/methods, the process 500 moves to block 518, where the web browser takes a protective action. Such protective actions taken by the web browser 150 may include remediation actions such as: 1) displaying a message, warning window, or the like, on the user computer 120; 2) alerting or notifying a system administrator about the security incident; and 3) quarantining the user computer 120 by blocking the user computer 120 from accessing the network 110, or otherwise disconnecting the user computer 120 from the network, or disabling the user computer 120.

As mentioned above, the process 500 also moves to block 514 from block 504. Since the instrumented JavaScript functions/methods protect the security analysis JavaScript functions/methods from being tampered with, disabled, or otherwise abused, the security analysis JavaScript functions/ methods can be freely executed by the web browser 150. In block 514, the security analysis JavaScript functions/methods are executed by the web server code based on event triggers. The event triggers may be predefined periodic time triggers which result in the periodic execution of security analysis JavaScript functions/methods, for example, on the order of every few seconds, in order to fortify the defense against malicious threats. The security analysis JavaScript functions/methods may also be called by the web server code upon other types of event triggers, such as, for example, browsing to a known suspicious web site.

The process 500 then moves to block 516, where security threats are identified by the executed security analysis JavaScript functions/methods in block 514. If the security analysis JavaScript functions/methods identify any threats, such as those, for example, from inauthentic domain names or other malicious activity related to URLs, the process 500 moves to block 518. If no such threats are identified by the execution of the security analysis JavaScript functions/methods, the process 500 loops back to block 514 for continued trigger based execution.

As discussed above, the processes performed by the gateway 130 and the web browser 150 (i.e., the processes 400 and 500) are performed in cooperation with each other to reduce the risk of tampering, disabling, or otherwise abusing of the injected security analysis JavaScript functions/methods by any adversarial party. As such, the aforementioned processes 400 and 500 may be performed in any order. However, for computing efficiency purposes, the process 400 is preferably performed prior to the process 500, to avoid the gateway 130 unnecessarily inspecting for references to instrumented JavaScript functions/methods previously injected by the gateway 130.

Although the cooperative execution of the processes 400 and 500 aims to reduce the risk of tampering, disabling, or otherwise abusing by an adversarial party, additional steps may be taken in order to further reduce such risk.

For example, although the injection process described above with reference to FIG. 4 preferably operates in real-time, the scripts in the files received from the gateway 130 require loading by the web browser prior to execution. Sophisticated adversarial parties may be able to time attacks with the script loading and falsely inject instrumented JavaScript functions/methods via the gateway during this load period. Accordingly, encryption functionality via for example, random tokens, is preferably added to the prototypes of the instrumented JavaScript functions/methods to prevent false injection, further reducing the risk of tampering, disabling, or otherwise abusing.

Additionally, as previously discussed, a script that includes instrumented JavaScript functions/methods is injected into the HTML page, JavaScript file, or JavaScript code segment (formed by the group of data packets) such that the script is the last script executed by the web browser 150. Since the script is injected such that it is executed last, a sophisticated adversarial party may add a script prior to the injected script that contains an error. The execution of the error containing script by the web browser 150, executing the web server code, prevents execution of scripts located after the error containing script, which includes the injected script containing the instrumented JavaScript functions/methods. In order to combat such actions taken by adversarial parties, the gateway 130 enables timeout functionality which prevents the exchange of packets with the network 110 if any such error containing scripts are added by an adversarial party. For example, if no analysis information is sent as output from the analysis functions during a predefined time interval, or if information is sent to the gateway 130 or a server linked to the gateway 130 prior to the receipt of the analysis information, indicative of such an error containing script, the gateway 130 blocks the web page corresponding to the requested URL from fully loading.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for injecting JavaScript, comprising:
inspecting at least one packet, received from a web server, for the presence of at least one value from a list of prohibited values, wherein the at least one value from the list of prohibited values is indicative of a malicious attempt to modify at least one prohibited native JavaScript function that is built into the JavaScript programming language; and
should the at least one value be absent from the at least one packet, responding to the inspecting by injecting at least one JavaScript code segment for execution by a web browser, the at least one JavaScript code segment including a plurality of JavaScript functions, the plurality of JavaScript functions including at least one security analysis JavaScript function that sends inspection vectors when executed and a plurality of modified JavaScript functions, each of the modified JavaScript functions created from a respective native JavaScript function to include at least one code segment that when executed inspects for: a dynamic modification of at least one JavaScript function from a prohibited list of JavaScript functions, a dynamic creation of at least one JavaScript function from the prohibited list of JavaScript functions, and a dynamic reference to at least one value from the list of prohibited values.

2. The method of claim 1, further comprising: executing at least one of the injected modified JavaScript functions based on identification of at least one event.

3. The method of claim 2, further comprising: responding to the inspection as a result of the executing by taking at least one protective action.

4. The method of claim 2, further comprising:
responding to the inspection as a result of the executing by not executing the respective native JavaScript function.

5. The method of claim 2, wherein the at least one event includes at least one of a predetermined time interval or a trigger caused by the execution of code received from the web server.

6. The method of claim 1, wherein the at least one security analysis JavaScript function includes at least one code segment which identifies malicious content in an HTML page, a JavaScript file, or a JavaScript code segment.

7. The method of claim 1, wherein the executing is performed by a web browser is installed on an endpoint.

8. The method of claim 1, wherein the inspecting of the at least one packet and the injecting are performed by a gateway that couples the web server to a web browser, the web server providing content of a web page to the web browser.

9. The method of claim 1, further comprising:
should the at least one value be present in the at least one packet, responding to the inspecting by performing at least one of discarding the at least one packet, or terminating a connection with the web server.

10. The method of claim 1, wherein the list of prohibited values is a predefined list, the predefined list including every tag, variable, function, method and object associated with the at least one security analysis JavaScript function.

11. The method of claim 1, wherein at least one of the respective native JavaScript functions is selected from a group consisting of: eval( ), string( ), parseInt( ), remove( ), getElementById( ), getEelementsByClassName( ), and write( ).

12. The method of claim 1, wherein the list of prohibited values includes at least one of a namespace, a tag, a variable, a function, a method or an object associated with at least one JavaScript function selected from the group consisting of: the modified JavaScript functions, or the native JavaScript functions from which the modified JavaScript functions are created.

13. The method of claim 1, wherein the at least one packet forms at least part of an HTML page, a JavaScript file, or a JavaScript code segment.

14. The method of claim 13, wherein the injecting includes:
locating the JavaScript code segment in the HTML page, the JavaScript file, or the JavaScript code segment, such that the modified JavaScript functions are the first code segments executed in the HTML page or JavaScript file, and such that the security analysis JavaScript function is the last or first code segment executed in the HTML page, the JavaScript file, or the JavaScript code segment.

15. The method of claim 1, wherein the list of prohibited values includes the prohibited list of JavaScript functions.

16. A computer system for injecting JavaScript, comprising:
a gateway coupling a web server to a web browser, the gateway comprising:
a storage medium for storing computer components; and
a computerized processor for executing the computer components comprising:
a computer module configured for:
inspecting at least one packet, received from the web server, for the presence of at least one value from a list of prohibited values, wherein the at least one value from the list of prohibited values is indicative of a malicious attempt to modify at least one prohibited native JavaScript function that is built into the JavaScript programming language; and
should the at least one value be absent from the at least one packet, responding to the inspecting by injecting at least one JavaScript code segment for execution by a web browser, the at least one JavaScript code segment including a plurality of JavaScript functions, the plurality of JavaScript functions including at least one security analysis JavaScript function that sends inspection vectors when executed and a plurality of modified JavaScript functions, each of the modified JavaScript functions created from a respective native JavaScript function to include at least one code segment that when executed inspects for: a dynamic modification of a JavaScript function from a prohibited list of JavaScript functions, a dynamic creation of a JavaScript function from the prohibited list of JavaScript functions, and a dynamic reference to at least one value from the list of prohibited values.

17. The computer system of claim 16, wherein the list of prohibited values includes at least one of a namespace, a tag, a variable, a function, a method or an object associated with at least one JavaScript function selected from the group consisting of: the modified JavaScript functions, or the native JavaScript functions from which the modified JavaScript functions were created.

18. The computer system of claim 16, further comprising:
an endpoint coupled to the gateway, the endpoint having a web browser installed thereon, the web browser configured to execute code in the at least one packet associated with an HTML page, a JavaScript file, or a JavaScript code segment received from the web server via the gateway.

19. The computer system of claim 18, wherein the computer module is further configured for providing the at least one injected JavaScript code segment to the web browser, and wherein the web browser is further configured to execute at least one of the modified JavaScript functions.

20. The computer system of claim 18, wherein the web browser is further configured to execute the at least one security JavaScript function based on at least one of a predetermined time interval or a trigger caused by the execution of code received from the web server.

21. The computer system of claim 16, wherein should the at least one value be present in the at least one packet the computer module is further configured to respond to the inspecting by discarding the packet or terminating a connection with the web server.

22. The method of claim 1, wherein the at least one value from the list of prohibited values is further indicative of a malicious attempt to reference at least one injected prohibited JavaScript function.

* * * * *